No. 831,440. PATENTED SEPT. 18, 1906.
K. IRVIN.
THREADLESS BOLT.
APPLICATION FILED AUG. 27, 1904.
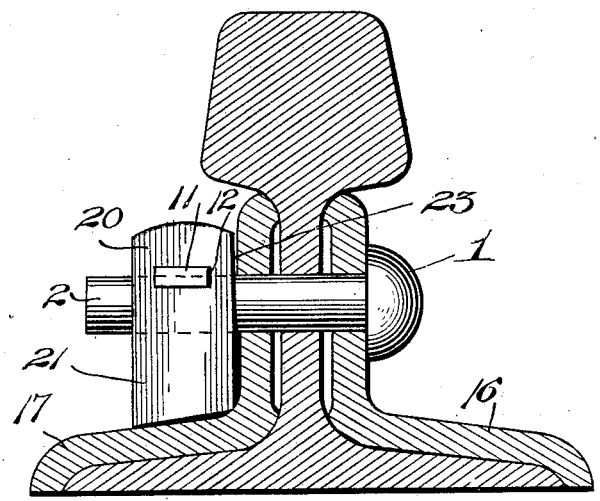
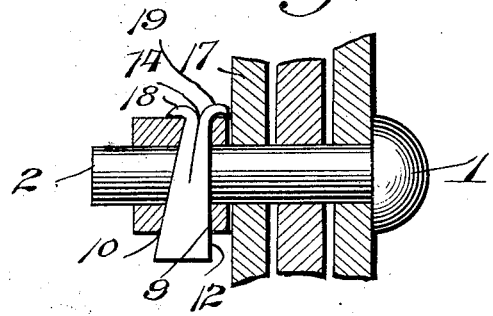
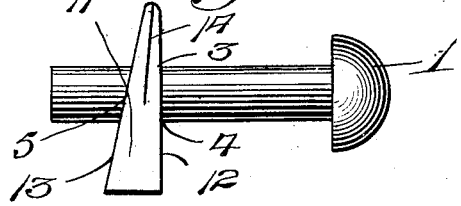 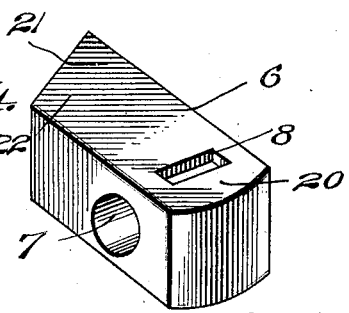
Witnesses
Phil E. Barnes
Bernard P. Vashon
Inventor
King Irvin
By Victor J. Evans
Attorney

UNITED STATES PATENT OFFICE.

KING IRVIN, OF MARYSVILLE, PENNSYLVANIA.

THREADLESS BOLT.

No. 831,440.      Specification of Letters Patent.      Patented Sept. 18, 1906.

Application filed August 27, 1904. Serial No. 222,419.

*To all whom it may concern:*

Be it known that I, KING IRVIN, a citizen of the United States, residing at Marysville, in the county of Perry and State of Pennsylvania, have invented new and useful Improvements in Threadless Bolts, of which the following is a specification.

This invention relates to threadless bolts.

The objects of the invention are to improve, simplify, and strengthen the construction of such devices.

With the foregoing objects in view the invention resides in the precise combination and arrangement of parts and in the exact details of construction hereinafter described and claimed as a practical embodiment thereof.

In the accompanying drawings, forming part of this specification, Figure 1 is a transverse section through a rail-joint, showing one of the improved nut-locks in position. Fig. 2 is a horizontal section through the rail-joint. Fig. 3 is a side elevation of the bolt, showing the position of the wedge therein. Fig. 4 is a perspective view of the improved nut.

Like reference-numerals indicate corresponding parts in the different figures of the drawings.

The improved nut-lock comprises a bolt having an enlarged head 1 and a plain or smooth shank 2. Formed in one side of the shank 2 is a slot 3, one wall 4 of which is disposed at a right angle with respect to the axis of the bolt, while the other wall 5 is inclined at an oblique angle with respect to the axis of the bolt. The wall 4 of the slot preferably is formed at the end thereof toward the enlarged head 1 of the bolt, as shown in Fig. 3.

Mounted upon the smooth shank 2 of the bolt is a nut 6, having a smooth bore 7 to receive said shank. Extending through the nut 6 is a passage 8, which intersects the bore 7. One wall 9 of the passage 8 is parallel with the walls 4 of the slot 3, while the other wall 10 thereof is parallel with the wall 5, as indicated in Fig. 1. Extending through the passage 8 of the nut 6 and through the slot 3 of the shank 2 is a wedge 11, having a wall 12, parallel with the wall 4, and a wall 13, parallel with the wall 5, said wedge being split at its small end, as shown by 14.

Although it will be understood that the improved device of this invention is adapted for use in various connections, it has been shown for the sake of illustration as a means for clamping together the fish-plates 16 and 17, which are shaped so as to cover the base of the rail, as shown. In using the improved device the bolt is passed through the fish-plates and rail-web and the nut 6 is fitted loosely thereupon. The pointed end of the wedge is introduced into the passage 8 and slot 3. It will be understood that when merely the pointed end of the wedge 11 is in the slot 3 the bolt 6 may be located away from the fish-plate 17. As the wedge 11 is driven home it forces the nut 6 closely against the fish-plate. In order to lock the device in position, it is necessary only to spread apart the split ends 18 19 of the wedge, as shown in Fig. 1.

It will be observed from Fig. 1 that the wedge 11 is disposed on one side of the shank 2. The tendency of the wedge when driven home, therefore, would be to force the small end 20 of the nut 6 against the fish-plate 17. In order to force the lower end 22 of the nut 6 with sufficient pressure against the fish-plate, said lower end is enlarged, as shown, the wall 21 thereof being beveled. Furthermore, the bearing-face 23 of the nut, which is adapted to bear against the fish-plate, is inclined slightly, as shown, from the enlarged side 22 of the nut toward the small side 20 thereof. By reason of this construction when the wedge is driven partially home the enlarged end 22 of the nut bears first against the fish-plate. As the wedge is driven completely home said enlarged end 22 is forced tightly against the fish-plate.

The device of this invention is strong, simple, durable, and inexpensive in construction. Furthermore, it is adapted to be manipulated without difficulty. In its particular combination and arrangement of parts and its precise details of construction it presents an improvement over prior devices intended for a similar purpose.

Having thus described the invention, what is claimed as new, and desired to be secured by Letters Patent, is—

In combination, a bolt formed with a slot having walls located at different angles relative to the axis of the bolt, a nut having a bore to receive the bolt and formed with an intersecting passage arranged to register with the slot in the bolt, the angle of the walls of said passage relative to the axis of the nut coinciding with the angle of the walls of the slot, said nut being enlarged at one side of the bore and formed with an inclined terminal face, and a wedge having side walls coinciding with the incline of the walls of the slot and passage, said wedge being adapted to be driven through the registering slot and passage, and means for securing the wedge against accidental displacement.

In testimony whereof I affix my signature in presence of two witnesses.

KING IRVIN.

Witnesses:
D. E. WERT,
HARRY MONTGOMERY.